United States Patent
Brown et al.

(10) Patent No.: US 9,367,692 B2
(45) Date of Patent: *Jun. 14, 2016

(54) SYSTEM AND METHOD FOR VALIDATING COMPONENTS DURING A BOOTING PROCESS

(71) Applicant: OpenPeak Inc., Boca Raton, FL (US)

(72) Inventors: John R. Brown, Boynton Beach, FL (US); John Irwin Perret-Gentil, Boca Raton, FL (US)

(73) Assignee: OPENPEAK INC., Boca Raton, FL (US)

(*) Notice: Subject to any disclaimer, the term of this patent is extended or adjusted under 35 U.S.C. 154(b) by 75 days.

This patent is subject to a terminal disclaimer.

(21) Appl. No.: 14/500,411

(22) Filed: Sep. 29, 2014

(65) Prior Publication Data

US 2015/0149757 A1    May 28, 2015

Related U.S. Application Data

(63) Continuation of application No. 13/542,833, filed on Jul. 6, 2012, now Pat. No. 8,850,177.

(60) Provisional application No. 61/506,017, filed on Jul. 8, 2011.

(51) Int. Cl.
  *G06F 21/57*    (2013.01)
  *G06F 21/71*    (2013.01)
  (Continued)

(52) U.S. Cl.
  CPC ............ *G06F 21/575* (2013.01); *G06F 9/4403* (2013.01); *G06F 21/71* (2013.01); *G06F 21/74* (2013.01); *G06F 2221/2105* (2013.01)

(58) Field of Classification Search
  CPC .................................................... G06F 21/575
  See application file for complete search history.

(56) References Cited

U.S. PATENT DOCUMENTS

| 5,454,110 A | 9/1995 | Kannan et al. |
| 5,826,012 A | 10/1998 | Lettvin |
| 6,263,431 B1 | 7/2001 | Lovelace et al. |

(Continued)

FOREIGN PATENT DOCUMENTS

EP    2141625 A2    1/2010

OTHER PUBLICATIONS

Lohr et al.; Patterns for Secure Boot and Secure Storage in Computer Systems; Published in: Availability, Reliability, and Security, 2010. ARES '10 International Conference on; Date of Conference: Feb. 15-18, 2010; pp. 569-573; IEEE Xplore.*

(Continued)

*Primary Examiner* — Bradley Holder

(57) ABSTRACT

A method and system for validating components during a booting process of a computing device are described herein. The method can include the steps of detecting a power up signal and in response to detecting the power up signal, progressively determining whether software components of the computing device are valid. If the software components are determined to be valid, the computing device may be permitted to move to an operational state. If, however, at least some of the software components are determined to be not valid, the computing device may be prevented from moving to the operational state. In one arrangement, if the computing device is prevented from moving to the operational state, corrective action can be taken in an effort to permit the computing device to move to the operational state.

10 Claims, 6 Drawing Sheets

(51) Int. Cl.
*G06F 21/74* (2013.01)
*G06F 9/44* (2006.01)

(56) References Cited

U.S. PATENT DOCUMENTS

| | | | |
|---|---|---|---|
| 6,330,670 B1 | 12/2001 | England et al. | |
| 6,757,838 B1 | 6/2004 | Chaiken et al. | |
| 6,792,564 B2 | 9/2004 | Ahrens, Jr. et al. | |
| 8,132,257 B2 | 3/2012 | Li et al. | |
| 8,150,039 B2 | 4/2012 | De Cesare et al. | |
| 8,171,272 B1 | 5/2012 | Chester et al. | |
| 8,560,820 B2 | 10/2013 | De Cesare et al. | |
| 8,850,177 B2 | 9/2014 | Brown et al. | |
| 2002/0099949 A1* | 7/2002 | Fries | G06F 21/575 726/24 |
| 2002/0133693 A1* | 9/2002 | Morrison | G06F 9/4405 713/1 |
| 2003/0120912 A1* | 6/2003 | Sasaki | G06F 9/4401 713/2 |
| 2004/0078679 A1* | 4/2004 | Cagle | G06F 9/4406 714/36 |
| 2005/0015606 A1* | 1/2005 | Blamires | G06F 21/575 713/188 |
| 2005/0033952 A1* | 2/2005 | Britson | G06F 9/4405 713/2 |
| 2006/0005034 A1* | 1/2006 | Willman | G06F 21/575 713/182 |
| 2006/0155988 A1* | 7/2006 | Hunter | G06F 21/575 713/164 |
| 2006/0161769 A1* | 7/2006 | Hunter | G06F 21/575 713/164 |
| 2006/0161784 A1* | 7/2006 | Hunter | G06F 21/575 713/182 |
| 2006/0161790 A1* | 7/2006 | Hunter | G06F 21/575 713/189 |
| 2006/0179302 A1* | 8/2006 | Hatakeyama | G06F 21/51 713/164 |
| 2007/0101156 A1 | 5/2007 | Novoa et al. | |
| 2007/0157011 A1* | 7/2007 | Kumar | G06F 11/0724 713/1 |
| 2007/0256144 A1 | 11/2007 | Hoffman et al. | |
| 2007/0288740 A1* | 12/2007 | Dale | G06F 9/4405 713/2 |
| 2007/0300207 A1* | 12/2007 | Booth | G06F 21/575 717/126 |
| 2008/0046990 A1* | 2/2008 | Narayanaswami | H04L 63/0428 726/9 |
| 2008/0104701 A1 | 5/2008 | Peacock et al. | |
| 2009/0172472 A1* | 7/2009 | Sun | G06F 11/1417 714/36 |
| 2009/0182535 A1 | 7/2009 | Ananny et al. | |
| 2009/0205045 A1 | 8/2009 | Horvath et al. | |
| 2010/0088769 A1 | 4/2010 | Ferino et al. | |
| 2012/0151464 A1 | 6/2012 | Koren et al. | |
| 2012/0185683 A1 | 7/2012 | Kristic et al. | |

OTHER PUBLICATIONS

Arbaugh et al.; Automated Recovery in a Secure Bootstrap Process; University of Pennsylvania Department of Computer and Information Science Technical Report No. MS-CIS-97-13; Aug. 1997; pp. 1-17; Penn Libraries University of Pennsylvania.*
Office Action for U.S. Appl. No. 13/542,833, mailed Jan. 30, 2014, 30 pages.
Arm Limited: "Arm Security Technology—Building a Secure System using TrustZone Technology", pp. 5-5-pp. 5-8.
David Cooper et al.: "Bios Protections Guidelines Recommendations of the National Institute of Standards and Technology", Apr. 30, 2011, pp. 2-1-pp. 3-5.
Norbert Pohlmann et al: "Dieser Artikelist Teil des Turaya Die offene Trusted-Computing-Sicherheitsplattform", Open Source Jahrbuchs 2007, Dec. 31, 2007, pp. 302-312.
Bernhard Kauer: "OSLO: Improving the security of Trusted Computing", Aug. 27, 2007, pp. 1-9.
Jeremy Daniel Wendt et al.: "Sandia Report Trusted Execution Technology", Jan. 31, 2011, Pate 13-22.
William Albert Arbaugh: "Chaining Layered Integrity Checks", Dec. 31, 1999.
Lohr H et al: "Patterns for Secure Boot and Secure Storage in Computer Systems", Availability, Reliability, and Security, 2010, ARES '10 International Conference on, IEEE, Piscataway, NJ, USA, Feb. 15, 2010, pp. 569-573.
Supplementary European Search Report for International Application No. EP12811089, dated Nov. 11, 2014, 9 pages.
International Search Report and Written Opinion received for PCT Application No. PCT/US2012/045753, mailed on Dec. 27, 2012, 9 pages.
Wen, Yingyou et al. A scheme of mobile platform based on trusted computing, 2010 International Conference on Computational Intelligence and Security, pp. 465-468, Dec. 11-14, 2010.
"Public Key Encryption and Digital Signature: How do they work?", web page available at: <http://www.cgi.com/files/white-papers/cgi_whpr_35_pki_e.pdf>, Retrieve date: unknown, Copyright 2004, CGI Group Inc., 12 pages.

* cited by examiner

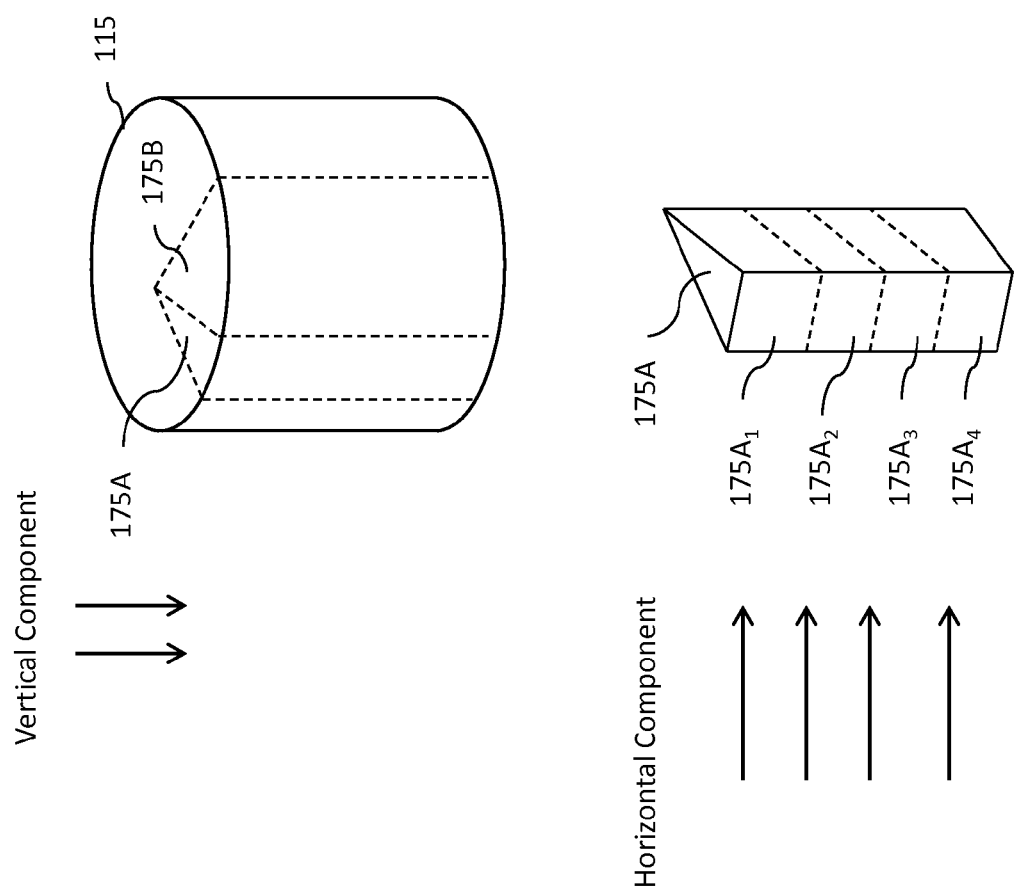

SYSTEM AND METHOD FOR VALIDATING COMPONENTS DURING A BOOTING PROCESS

CROSS-REFERENCE TO RELATED APPLICATIONS

This application is a continuation of U.S. patent application Ser. No. 13/542,833, filed on Jul. 6, 2012, which claims priority to U.S. Provisional Patent Application No. 61/506,017, filed Jul. 8, 2011, each of which is incorporated by reference herein in its entirety.

FIELD OF TECHNOLOGY

The present subject matter relates to systems and methods for validating components of a computing device during a booting process.

BACKGROUND

Recently, there has been a movement towards managed mobile devices. In such a configuration, an enterprise may permit the user of a managed device to access sensitive corporate data. In view of such access, it is important to maintain the integrity of these managed devices. For example, some users of managed devices may modify the devices to enable them to perform certain tasks that were not intended by the original manufacturer. Such a process is commonly referred to as "jailbreaking" a device. In this scenario, limitations imposed on the device by the manufacturer, operating system (OS), framework or runtime environment may be removed, which can permit unauthorized applications to be installed, hidden capabilities to be activated, security features to be bypassed or information that is normally inaccessible to be retrieved. As such, an enterprise must be certain that its protected data is not compromised by a device that has been altered in this fashion.

SUMMARY

A method for validating components during a booting process of a computing device is described herein. The method can include the steps of detecting a power up signal and in response to detecting the power up signal, progressively determining whether software components of the computing device are valid. If the software components are determined to be valid, the computing device can be permitted to move to an operational state. If at least some of the software components are determined to be not valid, the computing device can be prevented from moving to the operational state. In addition, if the computing device is prevented from moving to the operational state, corrective action can be taken in an effort to permit the computing device to move to the operational state.

As an example, the software components can include microcode, a bootloader and one or more OSs. In another example, the microcode can be stored in a secure portion of a memory component of the computing device. In one arrangement, progressively determining whether software components of the computing device are valid can include first determining whether the microcode is valid and determining whether the bootloader is valid subsequent to determining whether the microcode is valid and only if the microcode is valid. Progressively determining whether software components of the computing device are valid can further include determining whether the OS is valid subsequent to determining whether the bootloader is valid and only if the bootloader is valid.

As an example, the software components may include multiple OSs such that the computing device is capable of operating any one of the multiple OSs. Moreover, progressively determining whether software components of the computing device are valid may include determining whether the multiple OSs are valid in a parallel fashion. As an example, the parallel fashion may have a vertical component and a horizontal component. For example, multiple OSs may be validated in parallel to form the vertical component, while a single OS is itself validated in parallel to realize the horizontal component. As another example, taking corrective action may include reverting to an alternative software component in place of the software component that was determined to be not valid or signaling an administrator to obtain a replacement for the software component that was determined to be not valid.

A method for validating components during a booting process of a computing device that is capable of operating one of multiple OSs is described herein. This method can include the steps of detecting a power up signal and in response to detecting the power up signal, determining whether microcode of the computing device is valid. If the microcode is valid, the microcode can be executed, and it can be determined whether a bootloader of the computing device is valid. If the bootloader is valid, the bootloader can be executed, and it can be determined whether the OSs are valid in a parallel fashion. As an example, the parallel fashion can have a vertical component and a horizontal component.

The method here can also include the step of selectively loading one of the OSs so long as that OS was determined to be valid. In addition, the OS that is loaded may be selected based on a predetermined ranking. The method can also include the step of reading a master boot record as part of determining whether the OSs are valid, and the predetermined ranking may be part of the master boot record.

If a first OS is determined to be not valid, a second OS may be selectively loaded if the second OS is determined to be valid. The second OS may be selected based on the predetermined ranking, and the predetermined ranking of the second OS may have a lower priority than the predetermined ranking of the first OS.

In one arrangement, if any of the microcode, the bootloader or an operating system is determined to be not valid, corrective action may be taken. Examples of corrective action include any one of the following: (1) stopping the booting process and preventing the computing device from moving to an operational state; (2) stopping the booting process, preventing the computing device from moving to an operational state and informing a user of the failure of the booting process; (3) loading an alternative OS if a first OS is determined to be not valid; or (4) signaling an administrator (either manually or via an automated programmatic method) in an effort to obtain a replacement for the microcode, the bootloader or an OS if either of the microcode, the bootloader or the OS are determined to be not valid.

A system for validating components during a booting process of a computing device is also described herein. The system can include a power management engine that can be configured to receive a power up signal and can include a first memory component that can be configured to store software components that are related to a booting process. The system can also include a second memory component that can be configured to store software components, one of which may be an OS.

The system can also include a controller. The controller can be operable to progressively determine whether the software components that are related to the booting process and the OS are valid. If the software components and the OS are valid, the controller may permit the computing device to move to an operational state. If, however, any of the software components or the OS is determined to be not valid, the controller may prevent the computing device from moving to the operational state. If the computing device is prevented from moving to the operational state, the controller may take corrective action in an effort to permit the computing device to move to the operational state.

As an example, the controller may be operable to take corrective action by reverting to an alternative software component in place of the software component or the OS that was determined to be not valid. Another example of the controller taking corrective action is by signaling an administrator to obtain a replacement for the software component or the OS that was determined to not be valid.

In one arrangement, the first memory component may include a secure partition and a non-secure partition, and the software components that are related to the booting process are microcode and a bootloader. In addition, the microcode may be stored in the secure partition, and the bootloader may be stored in the non-secure partition. The second memory component may include multiple partitions and may be configured to store multiple OSs. In one arrangement, the first memory component and the second memory component are separate memory components.

As an example, the software components that are related to the booting process may be microcode and a bootloader. Also, the controller may be operable to progressively determine whether software components that are related to the booting process are valid by first determining whether the microcode is valid and determining whether the bootloader is valid subsequent to determining whether the microcode valid and only if the microcode is valid. As another example, the controller may be operable to progressively determine whether the software components that are related to the booting process and the OS are valid by determining whether the OS is valid subsequent to determining whether the bootloader is valid and only if the bootloader is valid. In one embodiment, the controller may be operable to determine whether multiple OSs are valid in a parallel fashion, and the parallel fashion may have a vertical component and a horizontal component.

Another system for validating components during a booting process of a computing device is described herein. The system can include a first memory component and a second memory component. The first memory component may be configured to store microcode and a bootloader, and the second memory component may include multiple partitions such that the second memory component is capable of storing multiple OSs. The system may also include a controller, and the controller may be operable to execute a bootstrap and determine whether the microcode is valid. If the microcode is valid, the controller may execute the microcode and (through the microcode) determine whether the bootloader is valid. If the bootloader is valid, the controller may also execute the bootloader and (through the bootloader) determine in a parallel fashion whether the multiple OSs are valid. As an example, the parallel fashion has a vertical component and a horizontal component.

In one arrangement, the controller is further operable to select one of the OSs for loading so long as that OS was determined to be valid, and the OS that is selected may be based on a predetermined ranking. If a first OS is determined to be not valid, the controller may be further operable to select a second OS for loading if the second OS is determined to be valid. The second OS may be selected based on the predetermined ranking, and the predetermined ranking of the second OS may have a lower priority than the predetermined ranking of the first OS. To be clear, the controller may be operable to perform these functions via operation of the bootloader.

In one arrangement, the first memory component may have a secure partition and a non-secure partition. As an example, the microcode may be stored in the secure partition, and the bootloader may be stored in the non-secure partition. The system may also include a power management engine that can be configured to signal the controller when the power management engine receives a power on signal.

Further features and advantage, as well as the structure and operation of various embodiments, are described in detail below with reference to the accompanying drawings. It is noted that this description is not limited to the specific embodiments presented herein. Such embodiments are provided for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

FIG. 6 illustrates an example of a memory component and an example of a partition of the memory component.

Figure 1:
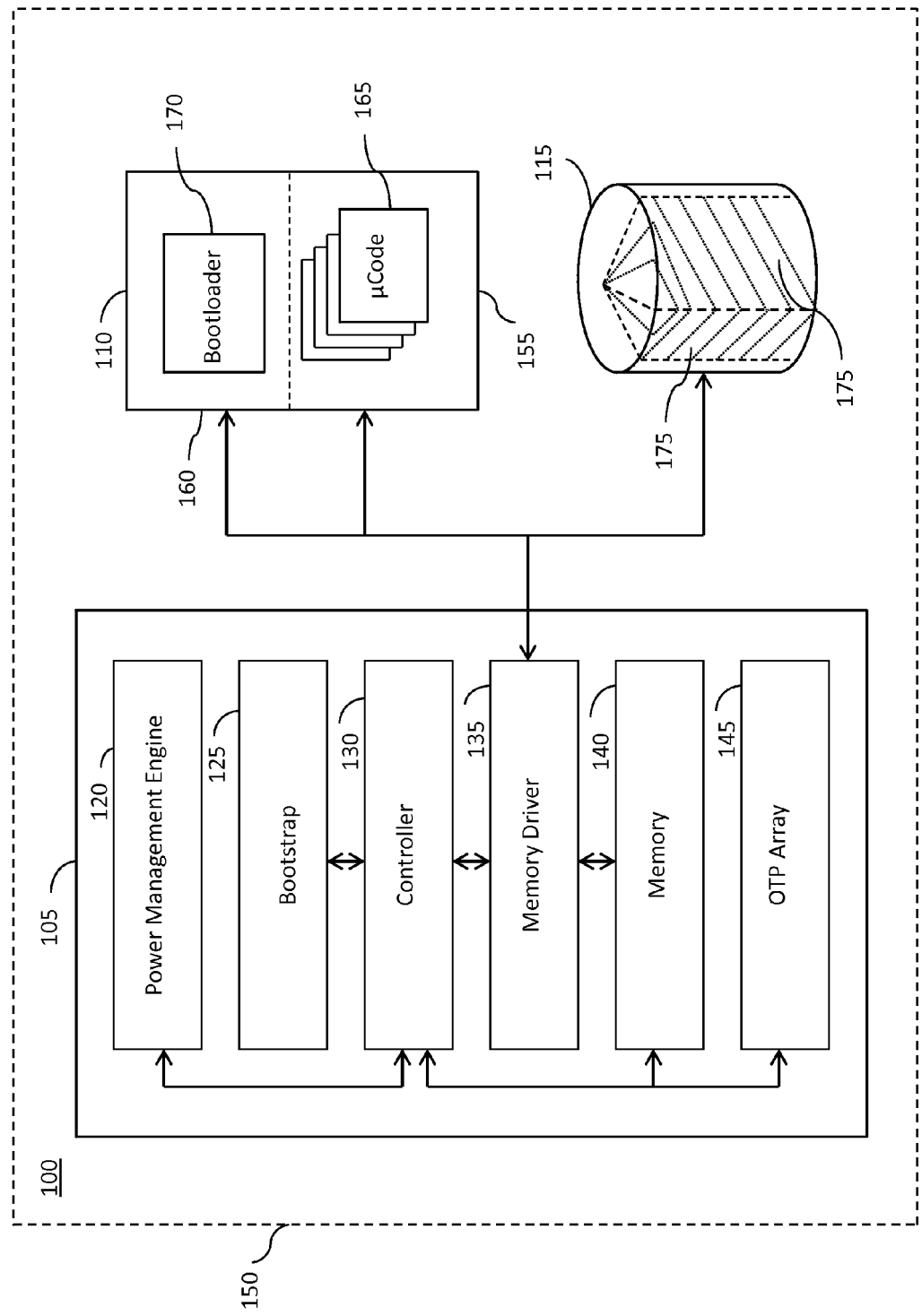
FIG. 1 illustrates an example of a system for validating components during a booting process of a computing device.

Applicants expressly disclaim any rights to any third-party trademarks or copyrighted images included in the figures. Such marks and images have been included for illustrative purposes only and constitute the sole property of their respective owners.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Furthermore, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described.

Several definitions that apply throughout this document will now be presented. The term "exemplary" as used herein is defined as an example or an instance of an object, apparatus, system, entity, composition, method, step or process. The term "communicatively coupled" is defined as a state in which two or more components are connected such that communication signals are able to be exchanged between the components on a unidirectional or bidirectional (or multi-directional) manner, either wirelessly, through a wired connection or a combination of both. A "computing device" is defined as a component that is configured to perform some process or function for a user and includes both mobile and non-mobile devices. An "application" is defined as a program or programs that provide(s) an interface to enable a user to operate a computing device in accordance with one or more particular tasks. The term "operating system" is defined as a collection of software components that directs a computing device's operations, including controlling and scheduling the execution of other programs and managing storage, input/output and communication resources.

The term "booting process" is defined as an initial series of steps carried out to load the operating system or runtime environment of a computing device when that computing device is activated. The term "power up signal" is defined as a signal that corresponds to a user action that is intended to activate a computing device. The term "microcode" is defined as a layer of hardware-level instructions or data structures involved in the implementation of higher level machine code instructions in a computing device. The term "bootloader" is defined as a program that is executed during a booting process to load the operating system or the runtime environment of a computing device when that computing device is activated.

An "interface" is defined as a component or group of components that at least receive(s) signals from a first component and transfers those signals to a second component in a form that is compatible with the second component. A "controller" is defined as one or more components that execute(s) sets of instructions. The term "memory component" is defined as one or more components that are configured to store data, either temporarily or persistently. A "software component" is a non-transitory program or set of instructions contained in a memory in which a validation process may be conducted on the program or set of instructions when the program or set of instructions is in the memory.

As noted earlier, there is a need to ensure that managed devices, which may have access to sensitive enterprise data, are in compliance with limitations that are imposed on the device by, for example, the manufacturer, OS, framework or runtime environment. To realize a solution, a system and method for validating components during a booting process of a computing device are described herein. In particular, a power up signal can be detected, and in response to detecting the power up signal, it can be progressively determined whether software components of the computing device are valid. If the software components are determined to be valid, the computing device may be permitted to move to an operational state. If, however, at least some of the software components are determined to be not valid, the computing device may be prevented from moving to the operational state. In one arrangement, if the computing device is prevented from moving to the operational state, corrective action can be taken in an effort to permit the computing device to move to the operational state.

In effect, the validation of these components may form a chain in which progressive validation enables secure operation from the lowest levels of the system to the highest. For example, if the microcode of a device is determined to be valid, the microcode may be executed and responsible for validating the bootloader of the device. If the bootloader passes validation, the bootloader may be executed and responsible for the OS validation. In this way, each component involved in the boot process may look forward only one step or link in the chain, which ensures a secure booting process.

As such, unauthorized changes to the computing device, including changes to the root file system, the OS or the installation of unpermitted content, can be detected when the device is powered up. In response to this detection, the computing device can be prevented from entering its runtime environment. As such, an early detection can prevent these undesirable modifications from impacting the operation of the computing device and from potentially exposing enterprise data to danger. An example of a corrective action that can be taken includes informing the user of the device that the device will not be permitted to enter the runtime environment or the device may contact an administrator to wipe and possibly replace the affected software components. Additional detail and examples will be described below.

Referring to FIG. 1, a system 100 for validating components during a booting process of a computing device is shown. In one arrangement, the system 100 can include a processing unit 105, a first memory component 110 and a second memory component 115. Both the first memory component 110 and the second memory component 115 may store various software components, some examples of which will be presented below. The processing unit 105 can include, for example, a power management engine 120, a bootstrap engine 125, a controller 130 (which may be comprised of one or more components), a memory driver 135, memory 140 and a one time programmable (OTP) array 145. The OTP array 145 may persistently store secure values that can help validate software components, such as keys that can be used in comparison with signatures that are associated with several different software components. Each of these components may be part of a computing device 150, such as a smartphone, a laptop, desktop or some other similar unit.

As another example, the first memory component 110 may include a secure portion or partition 155 and a non-secure partition 160. As a more specific example, the first memory component 110 may be a NAND memory device, although it is understood that the system 100 is not so limited. In one embodiment, the secure partition 155 may store microcode 165, while the non-secure partition 160 may house a bootloader 170, and each of these software components is important during the booting process of the computing device 150. In another example, the second memory component 115 may include multiple partitions 175. In one non-limiting arrangement, the second memory component 115 may be configured to or have the capability of storing multiple OSs in which each OS is associated with a partition 175. As an example, the second memory component 115 may be an embedded multimedia card (e-MMC), although certainly other memory elements are compatible with the description herein. Although the first memory component 110 and the second memory component 115 may be physically discrete and separate units, as shown in FIG. 1, it is understood that these components 110, 115 may form part of a single memory and may be embedded within some other element, such as a processor.

Moving back to the processing unit 105, the power management engine 120 can be configured to signal the controller 130 when the computing device 150 is activated. In this case, activating the device 150 can mean turning on the device 150 or performing a soft reboot of the device 150. In response, the controller 130 can begin executing the bootstrap 125, which can cause the controller 130 to instruct the memory driver 135 to fetch the microcode 165 from the secure partition 155 of the first memory component 110 and load the microcode 165 into the memory 140. In one arrangement, the memory 140 can be an SRAM, although other forms of memory can be employed here. At this point, the controller 130, via the bootstrap engine 125, can determine whether the microcode 165 is valid. If the controller 130 determines that the microcode 165 is not valid, the controller 130 can take corrective action, such as executing steps to cease the booting process, to inform the user of the failure or to seek assistance remotely, such as from an administrator. Although unlikely, a determination that the microcode 165 is invalid may be the result of some unauthorized modification of the microcode 165 or some other software or hardware related to or designed to work with the microcode 165. If the controller 130, however, determines that the microcode 165 is valid, the controller 130 can execute the microcode 165.

Upon the execution of the microcode 165, certain conventional processes can be carried out, such as the activation of several hardware components and the directing of bus traffic. In addition, the controller 130, via execution of the microcode, can instruct the memory driver 135 to fetch the bootloader 170 from the non-secure partition 160 of the first memory component 110 and to load the bootloader 170 into the memory 140. Here, similar to the process described above, the controller 130 (through the microcode 165) can determine whether the bootloader 170 is valid. If the controller 130 determines that the bootloader 170 is not valid, such as the result of some unauthorized modification, the controller 130 can take corrective action similar to that described above in relation to the microcode 165 failure. If, on the other hand, the controller 130 determines that the bootloader 170 is valid, the controller 130 can execute the bootloader 170.

As noted earlier, the second memory component 115 may store an OS. Once the bootloader 170 has been validated, the bootloader 170 may, for example, load and execute the kernel of the OS, which in turn can mount and employ the root file system of the OS. Before this process may be undertaken, however, the system 100 can determine whether the OS is valid, like the processes carried out for the microcode 165 and the bootloader 170. In the event that the controller 130 determines that the OS is not valid, the OS may not be permitted to be loaded, and the controller 130 can take corrective action, which can be in accordance with the options previously discussed (and to be presented below). If the OS is determined to be valid, the OS can be loaded, and the computing device 150 can be moved to an operational state. Additional explanations of the validation of the software components recited above will be presented below.

As also described earlier, the second memory component 115 is capable of storing multiple OSs. Such a configuration can permit the computing device 150 to run any one of a plurality of OSs. In one arrangement, each OS that is stored in the second memory component 115 can be validated in accordance with the process recited above. Thus, the system 100 can validate multiple OSs on a device that is capable of operating on any one of the OSs. In an effort to increase the efficiency of this process, it can be determined whether the multiple OSs are valid in a parallel fashion. That is, the steps described above with respect to validating an OS can be carried out at least substantially simultaneously for multiple OSs of the second memory component 115. As another option, any one of the partitions 175 storing the OSs may be segmented. By segmenting the partitions 175, each OS can be broken down into several components, which can be operated on by multiple bootloader threads for the expedient validation of a given OS. In this manner, the parallel fashion can have a vertical component (i.e., each of the multiple OSs) and a horizontal component (i.e., the segments of an individual OS) for purposes of validation. Additional explanation of this process will be presented below.

In another arrangement, the OSs may be prioritized such that it may be preferred to load and execute one OS over another OS. This feature can also provide alternatives in the event one OS is deemed to not be valid. For example, assume there are two OSs stored in the second memory component 115, and the validation process is executed for these two OSs at about the same time. Eventually, it may be determined that the default OS (i.e., the higher priority OS as indicated in, for example, the master boot record) is not valid, such as due to an unauthorized change in the root file structure. As an option, the system 100 can move on to the next OS on the priority list, in this case, a back-up OS (i.e., the lower priority OS). If this OS is deemed to be valid, this OS can be loaded and executed, and the computing device 150 can be moved to an operational state.

Figure 2:
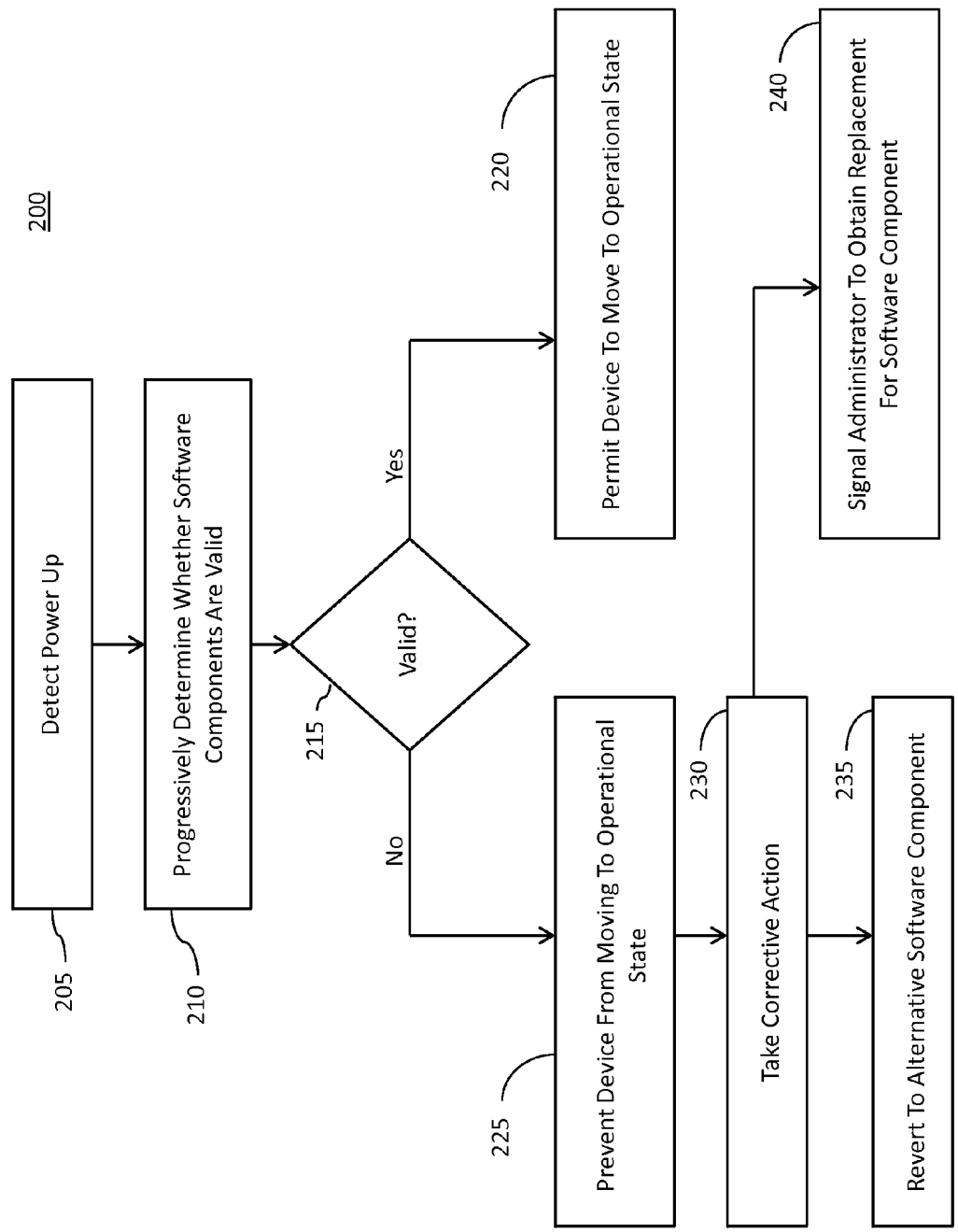
FIG. 2 illustrates an example of a method for validating components during a booting process of a computing device.

Referring to FIG. 2, a method 200 for validating components during a booting process of a computing device is shown. In this example, the discussion will focus on a computing device that has a single OS, although much of the description here is relevant to devices that include multiple OSs. This method 200 is exemplary in nature, and the steps presented here are not limited to this particular chronological order. Moreover, the method 200 may be practiced with additional steps or with fewer steps in comparison to what is pictured here. References will be made to FIG. 1 to explain the method 200, but it is understood that the method 200 can be practiced with other suitable systems and components.

At step 205, a power up signal can be detected, and in response to the detection of the signal, it can be progressively determined whether software components of a computing device are valid, as shown at step 210. At decision block 215, if the software components are deemed to be valid, then the computing device can be permitted to move to an operational state, as shown at step 220. If, however, the software components are deemed to be not valid, then the computing device can be prevented from moving to an operational state, as shown at step 225. At step 230, corrective action can be taken in an effort to permit the computing device to move to the operational state, and there are several alternatives. For example, at step 235, a process of reverting to an alternative software component in place of the software component that was determined to be not valid can be undertaken. As another example, an administrator can be signaled to obtain a replacement for the software component that was determined to not be valid, as shown at step 240.

An exemplary description of the method 200 will now be presented. As previously explained, the power management engine 120 can detect a power up signal and can signal the controller 130 accordingly. The controller 130 can begin to progressively determine whether software components of the computing device 150 are valid. The term "progressively determine whether software components are valid" is defined as a process by which a plurality of software components are successively evaluated in an effort to determine whether such software components have been modified in an unauthorized manner and subsequent software components rely on previously validated components for their evaluation. Some exemplary (i.e., non-limiting) software components of the computing device 150 include the microcode, the bootloader and the OS.

Figure 3:
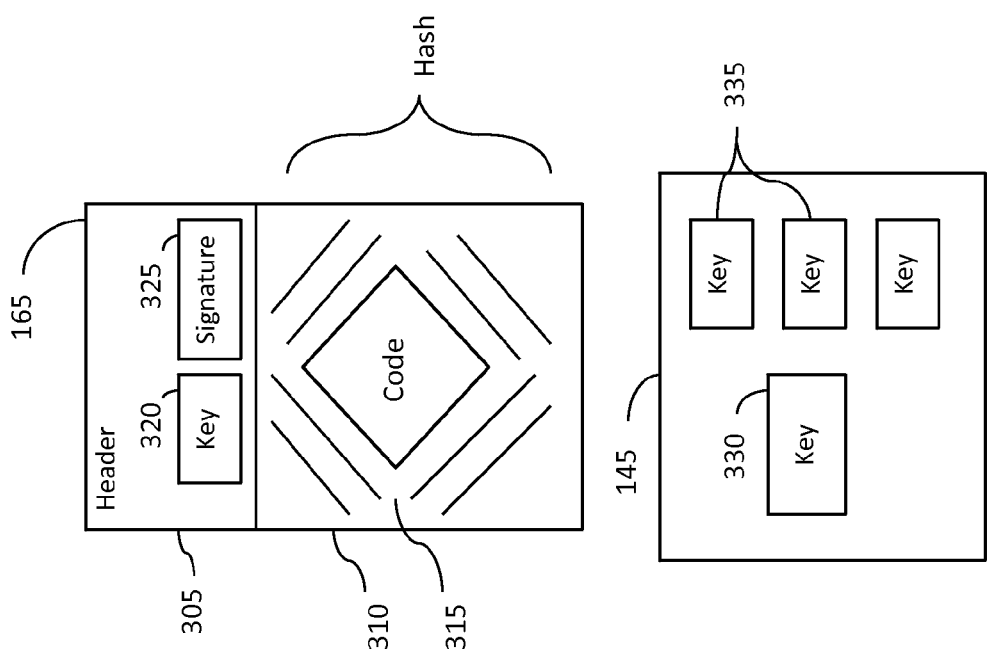
FIG. 3 illustrates an exemplary configuration that represents the microcode of a computing device and keys in an array.

As an example, prior to execution, the microcode 165 can be authenticated. Referring to FIG. 3, the microcode 165 may include a header 305 and a payload section 310, which can include the executable code 315. In one arrangement, the header 305 may include one or more secure values, such as a public key 320 and a signature 325, which can be a hash of the executable code 315 that is encrypted with the private key complement of public key 320 (other public-private key combinations may be employed here). In another arrangement, the OTP array 145 may be programmed with a corresponding secure value, such as a private key 330 that complements the public key 320 of the header 305 of the microcode 165. The OTP array 145 may also include several other secure values, such as keys 335 that may correspond to other secure values associated with other software components.

To determine whether the microcode 165 is valid, the controller 130—via execution of the bootstrap 125—can read the microcode 165, generate a hash based on the executable code 315 and encrypt this hash with, for example, the key 320 of the header 305 to generate a signature. This generated signature is then verified using the key 330 of the OTP array 145, which can determine whether the key 320 of the header 305 is the matching complement of the public/private key pair. If the generated signature is determined to be not valid, then the boot process may fail (additional description on this scenario will be presented below). If the generated signature is determined to be valid, then the generated signature can be compared with the signature 325 of the header 305. If the signatures do not match, then the boot process may fail. In contrast, if the signatures do match, then the microcode 165 can be considered to be valid and can be executed. Thus, this flow can ultimately ensure that the encrypted hash forming the signature 325 is able to be recreated by the programmatic re-computing of the hash of the code 315, which indicates that the code 315 has not been altered.

At this point, the system 100 can move on to the next software component, which, in this example, can be the bootloader 170. That is, it can be determined whether the bootloader 170 is valid subsequent to determining whether the microcode 165 is valid and only if the microcode 165 is valid. The process of determining whether the bootloader 170 is valid can be similar to the process described above with respect to determining whether the microcode 165 is valid. For example, the bootloader 170 may include a header that contains a key, such as the public key of a private-public key pair, and a signature. The signature in the header can be an encrypted hash of the executable code of the bootloader 170 that is encrypted with the key of the header. This key and the signature can be validated in accordance with the description above. If both the key and the signature cannot be validated, then the booting process may fail. In one arrangement, RSA algorithms may be used in place of the validation reliant on the OTP array 145. This feature may be useful in system where hardware supporting OTP-type authentication is unsupported.

Once the bootloader 170 is validated, the bootloader 170 can be executed. Subsequent to this validation, it can be determined whether the OS of the computing device 150 is valid, which may occur only if the bootloader 170 is determined to be valid. As an example, both the kernel and root file system of the OS may be validated. As part of the validation of the OS, the bootloader 170 can read a master boot record, which can provide relevant information about the structure of the OS. In addition, the validation process for the OS may be similar to that for the microcode 165 and the bootloader 170. In particular, the OS may include a header and executable code in which the header includes a key and a signature based on the executable code. As an example, this header may be stored in the second memory component 115 or some other suitable memory element. The controller 130, via execution of the bootloader 170, can validate the key and the signature, and if both elements are determined to be valid, the OS can be executed. This validation can permit the computing device 130 to move to an operational state. An "operational state" is defined as a state in which a machine has moved beyond the booting process and is able to perform its normal operations, which includes the ability to respond to user input and to function in its intended capacity.

If the OS cannot be determined to be valid, then the booting process may fail, and the computing device 130 may be prevented from moving to the operational state. In fact, as can be gleaned from the description above, if any of the software components of the computing device 130 (for example, the microcode 165, the bootloader 170 or the OS) cannot be validated, the booting process may fail, and the device 130 may be prevented from moving to the operational state.

If the booting process fails, the controller 130, via execution of the bootloader 170, may take corrective action in an effort to permit the computing device 150 to move to the operational state, several examples of which will now be presented. In one embodiment, the controller 130 can generate a signal that may result in a user of the computing device 150 being notified of the failure of the booting process. In another example, the controller 130 can revert to an alternative software component in place of the software component that we determined to be not valid. Consider the following exemplary scenario. During a booting process, it may be determined that the bootloader 170 is corrupted and cannot be validated. The computing device 150 may include a back-up bootloader program that can be retrieved and if validated, executed to continue the booting process. As another example, the controller 130 can generate a signal that can cause an administrator to be notified that the booting process of the computing device 150 has failed. For example, the bootloader 170 may have the capability to establish a runlevel that is sufficient to manage an IP stack to enable this feature. As part of this process, the administrator may obtain a replacement for the software component that was determined to be not valid, in this example, the bootloader 170. The administrator can push a new bootloader or other software component to the device 150 or can direct the device 150 to retrieve such components from another remote location. Once installed, the new software components can optionally be validated by the system 100 and can help move the device 150 to the operational state.

Figure 4:
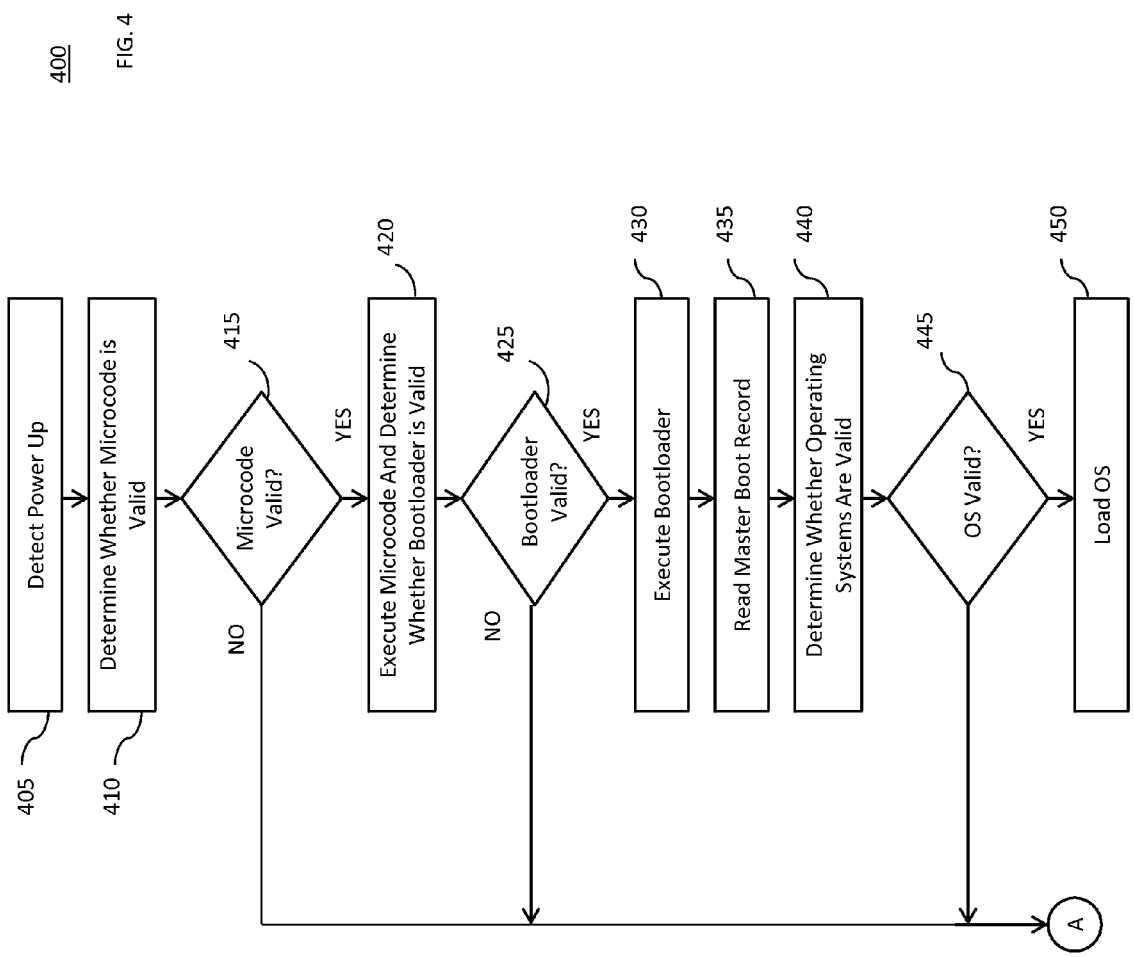
FIG. 4 illustrates an example of a portion of another method for validating components during a booting process of a computing device.

Referring now to FIG. 4, another method 400 for validating components during a booting process of a computing device is shown. Many of the steps of the method 400 are similar to those described in the method 200 of FIG. 2. The method 400, however, demonstrates additional processes that may be conducted on a computing device that is capable of supporting multiple OSs.

Similar to the method 200, this method 400 is exemplary in nature, and the steps presented here are not limited to this particular chronological order. Moreover, the method 400 may be practiced with additional steps or with fewer steps in comparison to what is pictured here. References will be made to FIGS. 1 and 3 to explain the method 400, but it is understood that the method 400 can be practiced with other suitable systems and components.

At step 405, a power up signal in a computing device can be detected, and in response to this detection, it can be determined whether microcode of the device is valid, as shown at step 410. At decision block 415, if the microcode is valid, the microcode can be executed, and it can be determined whether a bootloader of the device is valid, as shown at step 420. At decision block 425, if the bootloader is valid, the bootloader can be executed, and a master boot record can be read, as respectively shown in steps 430 and 435. At step 440, it can be determined whether multiple OSs are valid in a parallel fashion. At decision block 445, if a selected OS is valid, that OS can be loaded, which may be based at least in part on a predetermined ranking.

Figure 5:
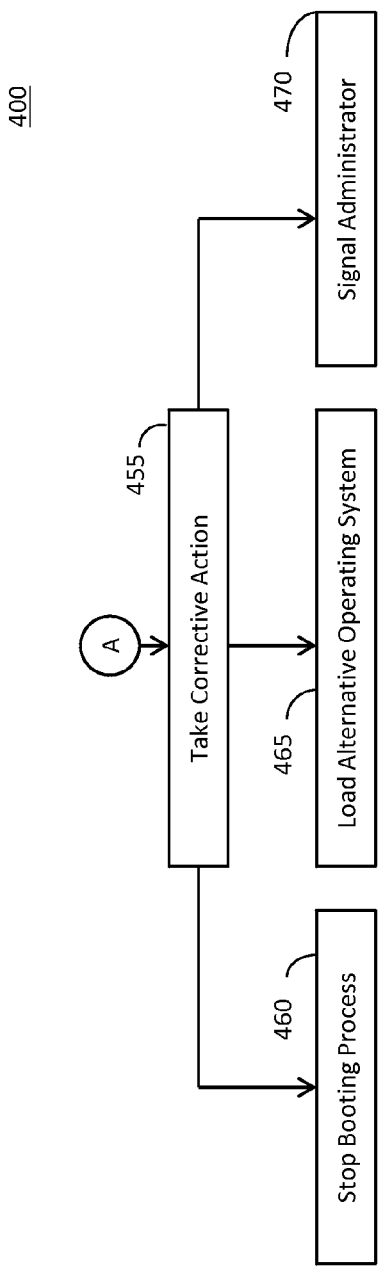
FIG. 5 illustrates an example of the remaining portion of the method of FIG. 4 for validating components during a booting process of a computing device.

If the microcode, the bootloader or the selected OS is deemed to be not valid, then (through jump circle A) corrective action can be taken, as shown at step 455 of FIG. 5. There are several alternatives for taking corrective action here. For example, the booting process can be stopped, as shown at step 460, or an alternative OS can be loaded, at least based in part on a predetermined ranking, if the first OS was determined to be not valid, as shown at step 465. As another example, at step 470, an administrator can be signaled in an effort to obtain a replacement for the microcode, the bootloader or the OS if either of the microcode, the bootloader or the OS is determined to be not valid.

As explained earlier, the computing device 150 may be capable of storing multiple OSs and executing any one of these OSs. During the booting process, the microcode 165 and the bootloader 170 of the computing device 150 can be validated in accordance with the description above. Once the bootloader 170 has been validated and its execution has started, the bootloader 170 can read a master boot record. In view of the possibility of the second memory component 115 storing multiple OSs, the master boot record can indicate, for example, the following particulars about each of the OSs: a partition number, an OS type, an OS revision and a predetermined state or ranking. The bootloader 170 can use this information to initiate the authentication of the multiple OSs. As will be explained later, the predetermined ranking can be useful in taking alternative actions in the event that one or more OSs cannot be validated.

The process of validating the OSs may be similar to that described in relation to the single OS validation of the method 200. That is, each OS may have a header that includes a key and a signature that is based on the executable code of the OS. The key in the header may be compared to a key 335 of the OTP array 145 to ensure its authentication. The controller 130 may also generate a signature and compare this generated signature to the signature in the header. If the signatures match, that OS may be considered to be valid. If the header key or signature validation fails, then the OS that cannot be validated may be prevented from being loaded, thereby preventing (at least initially) the computing device 150 from entering an operational state.

Because it may take some time to validate an OS, performing this process in a serial manner may take too long for some circumstances. To make the booting/validation procedure more efficient, the multiple OSs may be validated in a parallel fashion. To help explain this technique, reference will be made to FIG. 6. There, the second memory component 115 is shown in which two partitions 175A, 175B are pictured as part of the component 115. In this example, one may assume that the partition 175A holds a first OS, and the partition 175B contains a second OS. During the booting process, both the first OS and the second OS can be evaluated in accordance with the validation process described above, and this procedure can be carried out at roughly the same time for both OSs. That is, the controller 130, through the execution of an authenticated bootloader 170, can determine whether both of these OSs are valid at substantially the same time.

In addition to the simultaneous validation of multiple OSs, another alternative may be employed to make the process even more efficient. For example, the partition 175A is shown isolated in FIG. 6, with the partition 175A being divided into segments 175A$_1$, 175A$_2$, 175A$_3$ and 175A$_4$. Each of the segments 175A$_1$-175A$_4$ can have a header that includes a key and a signature, similar to the layouts previously described. In one arrangement, the header key can be the same key for each of the segments 175A$_1$-175A$_4$, and this key can be validated through a comparison with a complementary key 335 in the OTP array 145. In another arrangement, the signature in the header can be based on the executable code that is contained within the segment associated with that segment. For example, the signature in the header for the segment 175A$_1$ can be based on the code in the segment 175A$_1$. Thus, each of the segments 175A$_1$-175A$_4$ can be authenticated in accordance with the description above, and to improve efficiency, the segments 175A$_1$-175A$_4$ can be validated at substantially the same time.

As can be seen, determining whether multiple OSs are valid in a parallel fashion may comprise several components. The first example is a vertical component in which multiple OSs may be simultaneously authenticated. The second example is a horizontal component in which an OS is subdivided into multiple segments, and the segments may be simultaneously authenticated. In this illustration, this means that the four segments 175A1-175A4 of the first OS associated with partition 175A can be simultaneously validated, while at the same time, the segments (not shown) of the second OS associated with the partition 176A can be simultaneously validated. The phrase "determining whether operating systems are valid in a parallel fashion" means that at least some portion of a first OS can be validated at the same time as some portion of a second OS.

While validating in a parallel fashion may involve both a vertical and horizontal component, this technique is not limited as such. For example, it is not necessary to segment the OSs, as each OS of a plurality of OSs may be validated as a whole simultaneously. There are other arrangements that may be realized, as well. For example, a first OS may be segmented, but the second OS may not be segmented. Thus, during the validation, the segments of the first OS may be simultaneously authenticated, while the second OS may be validated as a whole at the same time. The validation of the second OS may take longer than that of the first OS, but the validation for the second OS should overlap at least some part of the first OS. It should also be understood that it is not necessary to validate multiple OSs in a parallel fashion, as these OSs could be done so in a consecutive or serial manner. Moreover, if an OS is segmented, it is not necessary for each of the segments to be simultaneously validated. For example, considering the segments 175A$_1$-175A$_4$, the first two segments 175A$_1$ and 175A$_2$ could be simultaneously authenticated, and the remaining two segments 175A₃ and 175A₄ could be simultaneously validated at a later time that does not overlap with the first two segments 175A₁-A₂.

It must also be stressed that the OSs are not limited to quarterly segments, as virtually any suitable fractional segmentation can be employed, including halves, thirds, eighths, etc. In fact, it is not necessary for the fractional segmentations to be equivalent to one another. For example, one segment may be equivalent to one-half of the OS, while the remaining two segments may be equivalent to one-quarter of the OS.

In either arrangement, if at least one of the OSs is determined to be valid, that OS can be loaded, and the computing device 150 can move to an operational state. If, however, an OS is determined to be not valid, corrective action may be taken. Some examples of the corrective action may be similar to that previously presented. For example, the booting process may simply be stopped, and the user may be notified of the issue. In another arrangement, an administrator may be signaled, and a replacement for the affected OS may be pushed to the computing device 150.

The inclusion of multiple OSs in the device 150 presents another alternative. In particular, an alternative OS can be loaded in place of the affected OS if the alternative OS has been authenticated, such as during the parallel validation process. As explained earlier, the master boot record may include a predetermined state or ranking field, and this predetermined ranking can provide an indication as to the preferred order of loading the multiple OSs. Consider the example in which the computing device 150 supports two OSs. The first OS may be a default OS, while the second OS may be considered as a back-up OS, which indicates that the second OS has a lower priority than the first OS. This configuration can be reflected in the master boot record. As such, if both OSs are validated, then the default OS can be loaded. If, however, the first OS cannot be validated, then the second OS can be loaded. In view of the parallel technique of validation, the back-up (i.e., second) OS can be loaded rather quickly. This predetermined raking feature can apply to any number OSs that the computing device 150 may support.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While various embodiments have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the claims and their equivalents should not be limited by any of the above-described exemplary embodiments.

What is claimed is:

1. A system for validating components during a secure booting process of a computing device, comprising:
   a first memory circuit component, wherein the first memory circuit component is configured to store microcode and a bootloader, wherein the microcode is the lowest level of a plurality of software components and the bootloader is the next level of the plurality of the software components;
   a second memory circuit component that is configured to store an operating system;
   a controller, wherein the controller is configured to:
   in response to a power on signal, execute a bootstrap and determine whether the microcode is valid;
   if the microcode is valid and only if the microcode is valid, execute the microcode and determine whether the bootloader is valid;
   if the bootloader is valid and only if the bootloader is valid, execute the bootloader and determine whether the operating system is valid; and
   cause an administrator to be notified in the event that the secure booting process is unable to be completed; and
   a third memory circuit component that is configured to store secure values that are used in comparison with signatures that are generated from the microcode, the bootloader, and the operating system for the validation of the microcode, the bootloader, and the operating system.

2. The system according to claim 1, wherein the controller is further configured to cause a user of the computing device to be notified of the failure of the secure booting process.

3. The system according to claim 1, wherein the failure of the secure booting process is caused by unauthorized changes to a root file system of the computing device, unauthorized changes to the operating system of the computing device or installation of unpermitted content.

4. The system according to claim 1, wherein the first memory circuit component includes a secure partition that is configured to store the microcode.

5. The system according to claim 1, wherein the computing device is a managed computing device and the secure booting process ensures that the managed computing device is in compliance with limitations that are imposed on the managed computing device.

6. A method for validating components during a secure booting process of a computing device, wherein the computing device includes a first memory circuit component, a second memory circuit component, and a third memory circuit component, comprising:
   storing microcode and a bootloader in the first memory circuit component, wherein the microcode is the lowest level of a plurality of software components of the computing device and the bootloader is the next level of the plurality of the software components;
   storing an operating system in the second memory circuit component;
   storing secure values in a third memory circuit component;
   in response to a power-on signal, executing a bootstrap and determining whether the microcode is valid;
   if the microcode is valid and only if the microcode is valid, executing the microcode and determining whether the bootloader is valid;
   if the bootloader is valid and only if the bootloader is valid, executing the bootloader and determining whether the operating system is valid;
   notifying an administrator in the event that the secure booting process is unable to be completed; and
   comparing the secure values stored in the third memory circuit component with signatures that are generated from the microcode, the bootloader, and the operating system for the validation of the microcode, the bootloader, and the operating system.

7. The method according to claim 6, further comprising notifying a user of the computing device of the failure of the secure booting process.

8. The method according to claim 6, wherein the failure of the secure booting process is caused by unauthorized changes to a root file system of the computing device, unauthorized changes to the operating system of the computing device or installation of unpermitted content.

9. The method according to claim 6, wherein the first memory circuit component includes a secure partition and wherein storing the microcode in the first memory circuit component comprises storing the microcode in the secure partition of the first memory circuit component.

10. The method according to claim 6, wherein the computing device is a managed computing device and the secure booting process ensures that the managed computing device is in compliance with limitations that are imposed on the managed computing device.

* * * * *